(12) United States Patent
Lin

(10) Patent No.: US 6,998,838 B2
(45) Date of Patent: Feb. 14, 2006

(54) LINEAR POSITION SENSOR HAVING ENHANCED SENSING RANGE TO MAGNET SIZE RATIO

(75) Inventor: Yingjie Lin, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 180 days.

(21) Appl. No.: 10/374,133

(22) Filed: Feb. 25, 2003

(65) Prior Publication Data

US 2004/0164727 A1     Aug. 26, 2004

(51) Int. Cl.
*G01B 7/14* (2006.01)

(52) U.S. Cl. ............................. 324/207.2; 324/207.24; 324/207.21

(58) Field of Classification Search ............ 324/207.2, 324/207.24, 207.21
See application file for complete search history.

(56) References Cited

U.S. PATENT DOCUMENTS

| | | | |
|---|---|---|---|
| 3,473,109 A | 10/1969 | Maaz et al. | |
| 4,319,236 A | 3/1982 | Brace et al. | |
| 4,810,965 A | 3/1989 | Fujiwara et al. | |
| 4,841,246 A * | 6/1989 | Juds et al. | 324/207.11 |
| 4,853,629 A | 8/1989 | Rops | |
| 5,164,668 A * | 11/1992 | Alfors | 324/207.2 |
| 6,160,395 A | 12/2000 | Goetz et al. | |
| 6,246,561 B1 * | 6/2001 | Flynn | 361/147 |
| 6,304,078 B1 * | 10/2001 | Jarrard et al. | 324/207.2 |
| 6,469,497 B1 | 10/2002 | Schroeder | |
| 6,498,482 B1 | 12/2002 | Schroeder | |
| 6,518,749 B1 * | 2/2003 | Oudet et al. | 324/207.2 |
| 6,577,123 B1 | 6/2003 | Schroeder et al. | |
| 6,633,159 B1 * | 10/2003 | Robar et al. | 324/240 |
| 2005/0012500 A1 * | 1/2005 | Braun et al. | 324/207.24 |

FOREIGN PATENT DOCUMENTS

| | | | |
|---|---|---|---|
| DE | 4418151 | * | 1/1994 |
| DE | 19738316 | * | 3/1999 |
| EP | 0798541 A1 | * | 1/1997 |
| JP | 55-122113 | * | 9/1980 |

* cited by examiner

*Primary Examiner*—Jay Patidar
(74) *Attorney, Agent, or Firm*—Jimmy L. Funke

(57) ABSTRACT

A sensor assembly for measuring linear position is provided. The assembly comprises a ferromagnetic magnetic flux concentrator. The flux concentrator is configured as a generally rectangular structure including an air gap at one side thereof. A magnet is slidable along the longitudinal axis of the concentrator. A galvanomagnetic sensing element is disposed in the air gap for sensing magnetic flux passing therethrough. The sensing element is configured to provide an output signal indicative of the measured linear position as the magnet travels along the longitudinal axis of the concentrator.

5 Claims, 1 Drawing Sheet

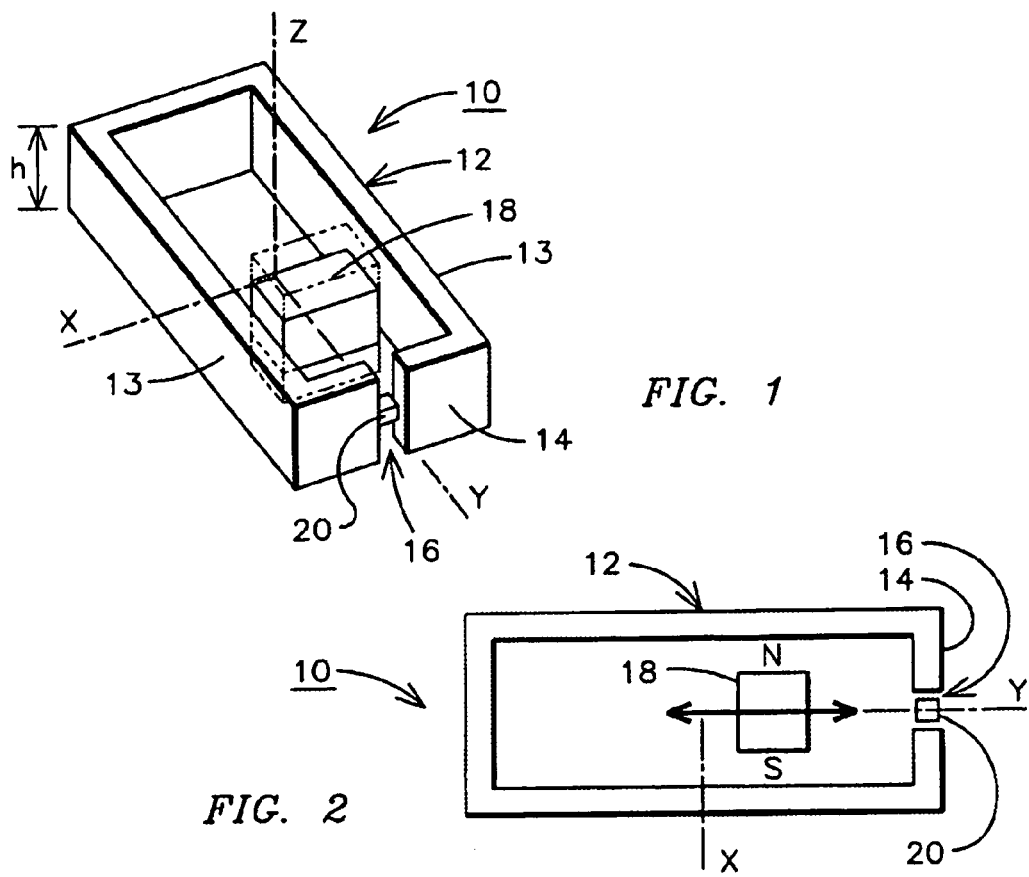
*FIG. 1*
*FIG. 2*
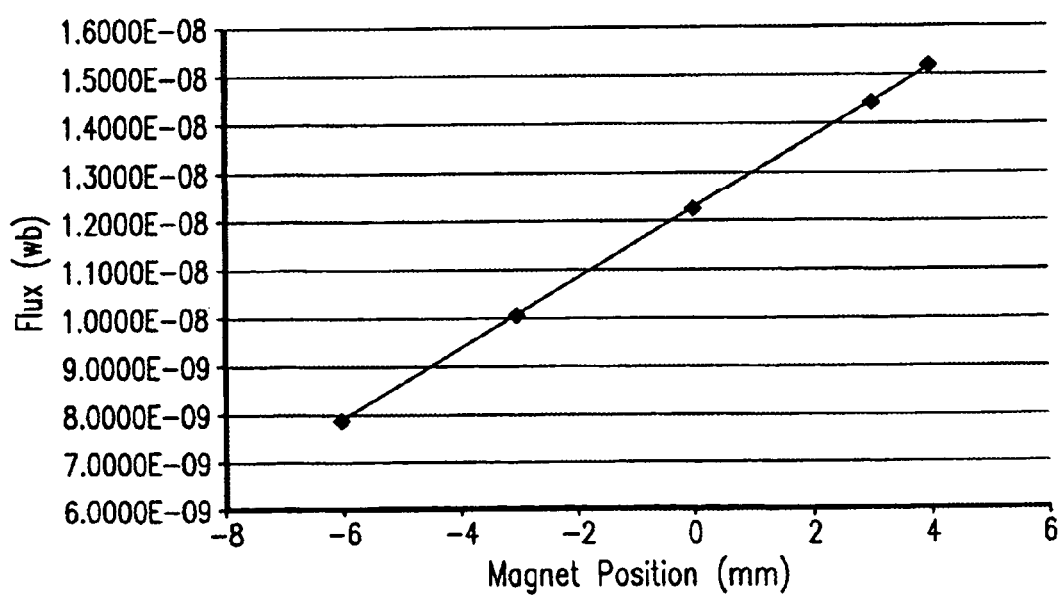
*FIG. 3*

1

LINEAR POSITION SENSOR HAVING ENHANCED SENSING RANGE TO MAGNET SIZE RATIO

BACKGROUND OF THE INVENTION

The present invention is generally related to position sensors, and, more particularly, to a linear position sensor that uses a relatively small magnet relative to the sensing range of the sensor.

Angular and linear position sensors are widely used in automatic control systems as feedback-sensing devices in one or more control loops of the system. In the automotive industry a relatively recent trend is providing control-by-wire in lieu of the more traditional control provided by mechanical linkages, such as cables, rods, etc.

Lower cost, higher performance, and utilization of robust sensing technology are some of the factors that make control-by-wire systems attractive to suppliers of automotive equipment, such as the assignee of the present invention. However, these control-by-wire systems generally require more sensors to provide the appropriate control functionality. Examples of sensors that are needed include sensors for providing linear position measurements. Although there are several technologies available for linear position measurement, these technologies may somewhat fall short in meeting the ever-increasing demands that are necessary to successfully compete in the automotive industry. Examples of such demands include lower costs, lower weight and volume as well as higher reliability and performance.

There are some known sensor design arrangements that use a magnet as the moving part relative to a stationary linear Hall device. Unfortunately, such known arrangements require that at least one of the magnet dimensions (e.g., magnet length) be larger than the measuring range of the sensor. This type of arrangement causes the sensor cost to increase because of the relatively high cost of the magnet, particularly for applications that require a relatively large measurement range.

In view of the foregoing, it would be desirable to provide an improved magnetic circuit that is not subject to the dimensional constraints of existing sensor arrangements while providing a relatively large linear output range. It would be further desirable to incrementally reduce the sensor costs by utilizing a relatively small magnet.

BRIEF SUMMARY OF THE INVENTION

Generally, the present invention fulfills the foregoing needs by providing in one aspect thereof, a sensor assembly for measuring linear position. The assembly comprises a ferromagnetic magnetic flux concentrator. The flux concentrator is configured as a generally rectangular structure including an air gap at one side thereof. A magnet is slidable along the longitudinal axis of the concentrator. A galvano-magnetic sensing element is disposed in the air gap for sensing magnetic flux passing therethrough. The sensing element is configured to provide an output signal indicative of the measured linear position as the magnet travels along the longitudinal axis of the concentrator.

BRIEF DESCRIPTION OF THE DRAWINGS

The features and advantages of the present invention will become apparent from the following detailed description of the invention when read with the accompanying drawings in which:

FIG. 1 is an isometric view of an exemplary embodiment of a sensor assembly embodying aspects of the present invention for magnetically sensing the linear position of an object.

FIG. 2 is a top view of the embodiment of FIG. 1.

FIG. 3 is a plot of an exemplary magnetic flux response of a magnetic sensor embodying aspects of the present invention as a function of magnet position.

DETAILED DESCRIPTION OF THE INVENTION

FIG. 1 is an isometric view of an exemplary embodiment of a sensor assembly 10 embodying aspects of the present invention for magnetically sensing the linear position of an object. That is, a sensor configured to provide contactless sensing of linear position. FIG. 2 is a top view of the embodiment of FIG. 1. Sensor assembly 10 comprises a magnetic flux concentrator 12 made of a material having relatively high permeability, such as ferrite magnetic material, nickel iron, silicone steel, etc., to reduce hysteresis effects. As seen in FIGS. 1 and 2, flux concentrator 12 may be configured to have a generally rectangular frame structure defining open top and bottom sections and being made up of walls 13 each having a height (h). Flux concentrator 12 is further configured to include at one side thereof (e.g., side 14) an appropriately dimensioned air gap 16. Sensor 10 further comprises a magnet 18 disposed within flux concentrator 12 and slideable along the longitudinal axis (e.g., Y axis) of the concentrator. For example, magnet 18 may be mechanically connected to be responsive to linear movement of a workpiece (e.g., a lever arm) or any other object whose linear position is being measured by the sensor assembly. A galvano-magnetic sensor 20, such as a Hall or magnetoresistive sensor, is positioned within the air gap 16 defined at side 14 of the concentrator. The inventor of the present invention has innovatively recognized that sensor assembly 10 enables a linear position sensor that uses a relatively small magnet relative to the sensing range of the sensor. In one exemplary embodiment, it is contemplated that a practical range for the length of the magnet may comprise approximately 20 to 30 percent of the measuring range of the sensor. As will be appreciated by those skilled in the art, this is a significant magnet size reduction over prior art devices that commonly require the magnet length to be larger than the measuring range of the sensor. The above exemplary range should not be construed as a limitation of the present invention since both the upper and lower margins of the exemplary range could be adjusted for any given application. For example, assuming magnet size (i.e., magnet cost) is not an issue, then the upper margin of the magnet size relative to the measuring range may be substantially larger than 30 percent. Similarly, assuming the sensing application may tolerate a relatively low signal-to-noise ratio, then the lower margin may be lower than 20 percent. As will be appreciated by those skilled in the art, the Z dimension of the magnet should be sufficiently larger or smaller relative to the Z dimension of the flux concentrator to reduce noise that may otherwise be induced if the magnet were to move along the Z-axis. That is, care should be exercised so that the Z-dimension of the magnet is not flush relative to the Z dimension of the flux concentrator. Thus, the height of the magnet should be either sufficiently smaller or greater than the height of the concentrator walls to reduce noise due to any non-longitudinal travel of the magnet. The magnet height being smaller than the concentrator walls is illustrated in FIG. 1 by the solid lines and the magnet height being greater than the concentrator walls by the dashed lines. The non-longitudinal travel, if any, would be perpendicular relative to the longitudinal axis of the concentrator, and parallel relative to the height of the magnet and the flux concentrator.

FIG. 3 is a plot of an exemplary magnetic flux response of a magnetic sensor embodying aspects of the present invention as a function of magnet position along the Y-axis. Thus, it will be appreciated that a sensor embodying aspects of the present invention is able to provide a substantially linear output over a relatively large range of linear displacement.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A sensor assembly for measuring linear position, the assembly comprising:
    a ferromagnetic magnetic flux concentrator, the flux concentrator configured as a generally rectangular frame structure defining open top and bottom sections and having four walls, only one of the walls including an air gap;
    a magnet slidable along a longitudinal axis of the concentrator; and
    a galvanomagnetic sensing element disposed in the air gap for sensing magnetic flux passing therethrough, the sensing element configured to provide an output signal indicative of the measured linear position as the magnet travels along the longitudinal axis of the concentrator.

2. The sensor assembly of claim 1 wherein the rectangular structure of the flux concentrator comprises walls each having a height that extends between the respective open top and bottom sections thereof.

3. The sensor assembly of claim 2 wherein the height of the magnet is sufficiently small relative to the height of the concentrator walls to reduce noise due to any non-longitudinal travel of the magnet, the non-longitudinal travel, if any, being perpendicular relative to the longitudinal axis of the concentrator, and parallel relative to the height of the magnet and the flux concentrator.

4. The sensor assembly of claim 2 wherein the height of the magnet is sufficiently large relative to the height of the concentrator walls to reduce noise due to any non-longitudinal travel of the magnet, the non-longitudinal travel, if any, being perpendicular relative to the longitudinal axis of the concentrator, and parallel relative to the height of the magnet and the flux concentrator.

5. The sensor assembly of claim 1 wherein the galvanomagnetic sensing element comprises an element selected from the group consisting of Hall and magnetoresistive sensing elements.

* * * * *